United States Patent Office 3,401,136
Patented Sept. 10, 1968

3,401,136
DIPENTENE POLYMER COMPOSITIONS
Henry G. Sellers, Jr., Pensacola, Fla., assignor to Tenneco Chemicals, Inc., a corporation of Delaware
No Drawing. Filed Jan. 8, 1964, Ser. No. 336,352
7 Claims. (Cl. 260—29.8)

ABSTRACT OF THE DISCLOSURE

Dipentene polymer compositions that have softening points in the range of 0° C. to 85° C. and that are useful as components of hot melt coating compositions, adhesives, and the like contain as modifier at least 5%, and preferably 20% to 80%, of oligomers of cyclic monoterpene hydrocarbons, such as dipentene dimer and/or trimer This invention relates to novel compositions of matter. More particularly, it relates to dipentene polymer compositions having softening points below approximately 90° C. and to methods for the production of these compositions.

It is well known that dipentene can be polymerized to form solid resinous products that are useful in the manufacture of paper coatings, adhesives, rubber compounds, and other industrial products. In the process ordinarily used for the preparation of these resinous products dipentene is polymerized in hydrocarbon solution in the presence of a Friedel-Crafts catalyst, such as aluminum chloride, stannic chloride, antimony chloride, or boron trifluoride. The resulting polymer solution is treated with lime and an adsorbent material, such as fuller's earth or finely-divided clay, and then heated to dechlorinate it. After filtration, the filtrate is distilled to separate from the polymer low boiling materials including the solvent, dipentene monomer, and dipentene oligomers. The dipentene polymers resulting from this procedure are hard brittle products that have softening points above 90° C. and generally in the range of 100° C. to 140° C. While these polymers can be used in many applications, they are not satisfactory for use in hot melt coating compositions and other products where the use of products having lower softening points and greater toughness is required.

Numerous attempts have been made to modify the properties of dipentene polymers by adding to them mineral oil or low melting resinous products. In each case, however, the additive was not sufficiently compatible with the dipentene polymer to form useful products, or it adversely affected the properties of the polymer.

In accordance with the present invention it has now been found that dipentene polymer compositions that have softening points in the range of approximately 0° C. to 85° C. and that have toughness and viscosity characteristics that make them valuable as components of hot melt coating compositions, adhesives, and the like can be obtained by adding an oligomer of a cyclic monoterpene hydrocarbon to a dipentene polymer.

While all dipentene polymers can be used in the practice of this invention, the novel processes are of particular value in the modification of the properties of dipentene polymers having softening points of 90° C. or higher. Exceptionally advantageous results have been obtained when the dipentene polymers used had softening points in the range of 100° C. to 140° C.

As used herein, the term "oligomers of cyclic monoterpene hydrocarbons" relates to low molecular weight polymers of cyclic terpene hydrocarbons that have the formula $C_{10}H_{16}$, for example, dipentene, limonene, α-pinene, β-pinene, p-cymene, camphene, and mixtures thereof. These oligomers are preferably dimers or mixtures of dimers and trimers which may contain a small amount of tetramers. They generally have boiling points in the range of 170° C. to 240° C. at 10 mm. and molecular weights in the range of 270 to 450.

The oligomers may be obtained by any suitable and convenient procedure. For example, they may be obtained from the low boiling fraction that is separated from dipentene polymers prepared by the aforementioned procedure. This fraction which contains approximately 30% to 50% by weight of hydrocarbon solvent and dipentene monomer, 20% to 60% by weight of dipentene oligomers, and 10% to 30% by weight of dipentene polymer may be distilled under reduced pressure to separate the dipentene oligomers from the other components of the fraction. Alternatively, the entire low boiling fraction may be blended with the dipentene polymer and the hydrocarbon solvent and the dipentene monomer subsequently removed from the composition by steam distillation. It is often preferred to add to the dipentene polymer an amount of the aforementioned low boiling fraction that contains more of the dipentene oligomers than is necessary to bring about the lowering of the softening point of the polymer to the required level and to steam distill the resulting mixture to remove from it the hydrocarbon solvent and the dipentene monomer as well as sufficient oligomer to yield a composition having the desired softening point.

Alternatively, the oligomers can be prepared by the polymerization of turpentine in the presence of a Friedel-Crafts catalyst and a hydrocarbon solvent. After distillation to remove the solvent, the turpentine polymer contains approximately 5% to 15% by weight of terpene monomers (principally α-pinene and β-pinene), 50% to 90% by weight of terpene oligomers, and 5% to 40% by weight of terpene polymers. This material may be distilled to separate the oligomers from the other components, or it can be used without further purification in the dipentene polymer compositions of this invention.

The amount of the terpene oligomer that is present in the dipentene polymer compositions is largely dependent upon the softening point of the dipentene polymer and the desired softening point of the composition. In most cases the presence of at least 5% and preferably at least 10% of oligomer, based on the weight of the dipentene polymer composition, will bring about the necessary modification of the properties of the dipentene polymer. When dipentene polymers having softening points in the range of 100° C. to 140° C. are used, it is generally preferred that approximately 20% to 80% of the oligomer, based on the weight of the composition, be present.

The procedure by which the terpene oligomers are incorporated into the dipentene polymer compositions is not critical. For example, the dipentene polymer and the oligomer may be heated together at a temperature between the softening point of the polymer and approximately 150° C. until a homogeneous product is obtained. Alternatively, the dipentene polymer may be dissolved in a solution of the oligomer in a hydrocarbon solvent, or solutions of the polymer and the oligomer may be combined. Upon removal of the solvent, for example, by distillation, homogeneous dipentene polymer composition having softening points in the desired range are obtained.

The invention is further illustrated by the examples that follow. It is to be understood, however, that these examples are given solely for the purpose of illustration and that the invention is not to be regarded as being limited to the specific materials or conditions recited therein except as set forth in the appended claims. The softening points of the dipentene polymers and of the dipentene polymer compositions were determined by the Ball and Ring Method (ASTM E-28-51T). Unless otherwise specified, all percentages are percentages by weight.

Example 1

A solid dipentene polymer was prepared by the following procedure: To a mixture of 10 grams of anhydrous aluminum chloride, 250 grams of toluene, and 250 grams of petroleum naphtha (B.P. 118°–148° C.) was added 500 grams of dipentene. The reaction mixture was agitated and maintained at 40°–45° C. during the addition of the dipentene. When all of the dipentene had been added, the mixture was maintained at 40°–45° C. for an additional hour. Then 25 grams of calcium hydroxide and 25 grams of acid-treated clay were added. The resulting mixture was heated with agitation until approximately half of the solvent had distilled off and then at its reflux temperature for 15 hours without the removal of any additional solvent. Following hot filtration, the polymer solution was heated to a pot temperature of 220° C., sparged with steam until 500 grams of water was present in the distillate, and cooled to room temperature. There was obtained 350 grams of a dipentene polymer that had a softening point of 122.2° C. A 50% solution of this polymer in mineral spirits had a Gardner color of 3.

The distillate was distilled under reduced pressure to remove the water from it and then distilled at 10 mm. absolute pressure. The following fractions were obtained:

| Fraction | Composition | B.P./10 mm. (° C.) |
|---|---|---|
| A | Naphtha and dipentene monomer | <170 |
| B | Dipentene oligomers | 170–210 |
| C | Polymer (B and R softening point, 104° C.) | |

Example 2

To samples of the dipentene polymer whose preparation was described in Example 1 were added various amounts of the dipentene oligomers obtained as Fraction B in the distillation step described in Example 1. The resulting blends were heated at approximately 125° C. until homogeneous products were obtained and then cooled to room temperature. The composition of the blends and their softening points were as follows:

| | Percent by weight | | Softening point (° C.) |
|---|---|---|---|
| | Dipentene polymer | Dipentene oligomers | |
| 2A | 100 | | 122.2 |
| 2B | 50 | 50 | 50 |
| 2C | 42 | 58 | 41.5 |
| 2D | 40 | 60 | 37.5 |
| 2E | 35 | 65 | 34 |
| 2F | 30 | 70 | 29 |

Example 3

A solid dipentene polymer was prepared by the following procedure: To a mixture of 1170 pounds of toluene, 1170 pounds of petroleum naphtha, and 133 pounds of anhydrous aluminum chloride was added 3500 pounds of dipentene over a period of 5 hours. The reaction mixture was agitated and maintained at 40° C. during the addition of the dipentene. When all of the dipentene had been added, the mixture was maintained at 40° C. for an additional 30 minutes. Then 133 pounds of hydrated lime and 133 pounds of acid-treated clay were added. The resulting mixture was distilled until a pot temperature of 140° C. was reached and then heated at its reflux temperature for 8 hours. When the mixture had cooled to 120° C., 1080 pounds of naphtha was added to it. Following filtration, the polymer solution was heated to a pot temperature of 200° C. to distill off the solvent and then sparged with steam to remove the last traces of solvent. There was obtained approximately 3000 pounds of a dipentene polymer that had a softening point of approximately 95° C.

The addition of 222 pounds of dipentene oligomer to this product yielded a dipentene polymer composition that had a softening point of 85° C. When 1110 pounds of dipentene oligomer was added to 3000 pounds of this dipentene polymer, the resulting dipentene polymer composition had a softening point of 40° C.

Example 4

A turpentine polymer was prepared by the following procedure: To a mixture of 25 grams of aluminum chloride, 250 grams of toluene, and 250 grams of petroleum naphtha was added 500 grams of peroxide-free turpentine. The reaction mixture was agitated and maintained at 40° C. during the addition of the turpentine. When all of the turpentine had been added, the mixture was maintained at 40° C. for an additional hour. Then 25 grams of calcium hydroxide and 25 grams of acid-treated clay were added. The resulting mixture was heated with agitation until approximately half of the solvent had distilled off and then at its reflux temperature for 16 hours without the removal of any additional solvent. Following hot filtration, the mixture was steam distilled until the pot temperature reached 200° C. There was obtained 427 grams of a fraction that consisted essentially of terpene oligomers.

A composition was prepared that contained 42% of a dipentene polymer that had a softening point of 125° C. and 58% of the aforementioned terpene oligomer fraction. This composition had a softening point of 41.5° C.

Example 5

A dipentene polymer composition was prepared by heating at 125°–130° C. a dipentene polymer that had a softening point of 125° C. with dipentene oligomers prepared by the procedure described in Example 1 in amounts sufficient to yield a composition having a softening point of 40° C.

This composition, which had an average molecular weight of 520, was distilled in a molecular pot still at 2–4 microns' pressure to yield the following fractions:

| Fraction | B.P./2–4 microns (° C.) | Average molecular weight | Percent of weight of composition |
|---|---|---|---|
| A | <100 | 398 | 11.4 |
| B | 100–200 | 405 | 30.0 |
| C | Residue | 716 | 57.7 |

From these data it will be seen that the composition contained 41.4% of dipentene oligomers and 57.7% of dipentene polymer.

Example 6

A dipentene polymer composition was prepared by heating at approximately 110° C. a dipentene polymer that had a softening point of 85° C. with dipentene oligomers prepared by the procedure described in Example 1 in amounts sufficient to yield a composition having a softening point of 40° C.

The composition, which had an average molecular weight of 550, was distilled in a molecular pot still at 2–4 microns' pressure to yield the following fractions:

| Fraction | B.P./2–4 microns (° C.) | Average molecular weight | Percent of weight of composition |
|---|---|---|---|
| A | <100 | 390 | 3.5 |
| B | 100–200 | 425 | 42.2 |
| C | Residue | 717 | 53.9 |

What is claimed is:

1. A process for the production of dipentene polymer compositions having softening points in the range of approximately 0° C. to 85° C. which comprises adding to a dipentene polymer at least 5%, based on the weight of the composition, of oligomers of a cyclic monoterpene hydrocarbon.

2. A process for the production of dipentene polymer compositions having softening points in the range of approximately 0° C. to 85° C. which comprises adding to a dipentene polymer having a softening point above 90° C.

at least 10%, based on the weight of the composition, of oligomers of a cyclic monoterpene hydrocarbon.

3. A process for the production of dipentene polymer compositions having softening points in the range of approximately 0° C. to 85° C. which comprises adding to a dipentene polymer having a softening point in the range of 100° C. to 140° C. at least 10%, based on the weight of the composition, of dipentene oligomers.

4. A process for the production of dipentene polymer compositions having softening points in the range of approximately 0° C. to 85° C. which comprises adding to a dipentene polymer having a softening point in the range of 100° C. to 140° C. 20% to 80%, based on the weight of the composition, of dipentene oligomers.

5. A process for the production of dipentene polymer compositions having softening points in the range of approximately 0° C. to 85° C. which comprises adding to a dipentene polymer having a softening point in the range of 100° C. to 140° C. 20% to 80%, based on the weight of the composition, of dipentene oligomers and heating the resulting mixture at a temperature between the softening point of said polymer and approximately 150° C. until a homogeneous composition is obtained.

6. A process for the production of dipentene polymer compositions having softening points in the range of approximately 0° C to 85° C. which comprises adding to a dipentene polymer having a softening point in the range of 100° C. to 140° C. an amount of a solution of dipentene oligomers in a hydrocarbon solvent that will provide an amount of dipentene oligomers that is 20% to 80% of the total weight of dipentene oligomers and dipentene polymer and thereafter removing the hydrocarbon solvent from the composition.

7. A process for the production of dipentene polymer compositions having softening points in the range of approximately 0° C. to 85° C. which comprises adding to a dipentene polymer having a softening point in the range of 100° C. to 140° C. 20% to 80%, based on the weight of the composition, of oligomers of a cyclic monoterpene hydrocarbon, said oligomers boiling in the range of 170°–240° C. at 10 mm. pressure and being the product of the polymerization of turpentine in the presence of a Friedel-Crafts catalyst.

References Cited

UNITED STATES PATENTS

| | | | |
|---|---|---|---|
| 2,391,293 | 12/1945 | Carmody | 260—93.3 |
| 1,691,067 | 11/1928 | Humphrey | 260—93.3 |
| 2,368,767 | 2/1945 | Moore | 260—93.3 |
| 3,253,059 | 5/1966 | Volmer | 260—93.3 |
| 2,505,740 | 4/1950 | Morris | 260—29.8 |

FOREIGN PATENTS

| | | |
|---|---|---|
| 676,100 | 12/1963 | Canada. |
| 676,351 | 12/1963 | Canada. |

OTHER REFERENCES

Mzourek Plasteund Kantschuk, vol. 7, 1960, pp. 396, 397, 398 (1960).

JULIUS FROME, *Primary Examiner.*